July 4, 1961 L. G. FREEMAN 2,991,138
ADJUSTABLE SWINGABLE TRAY
Filed April 20, 1959
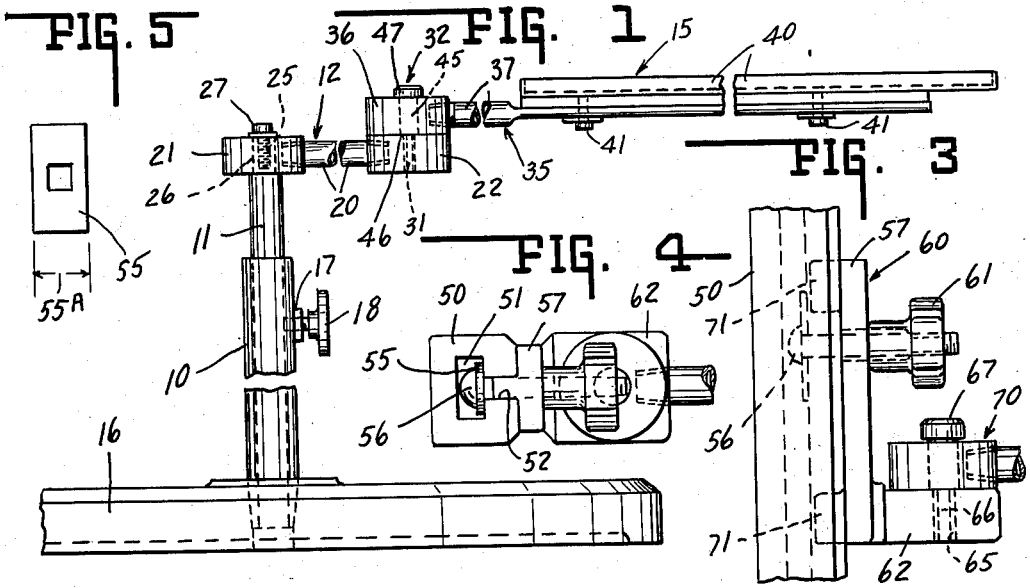
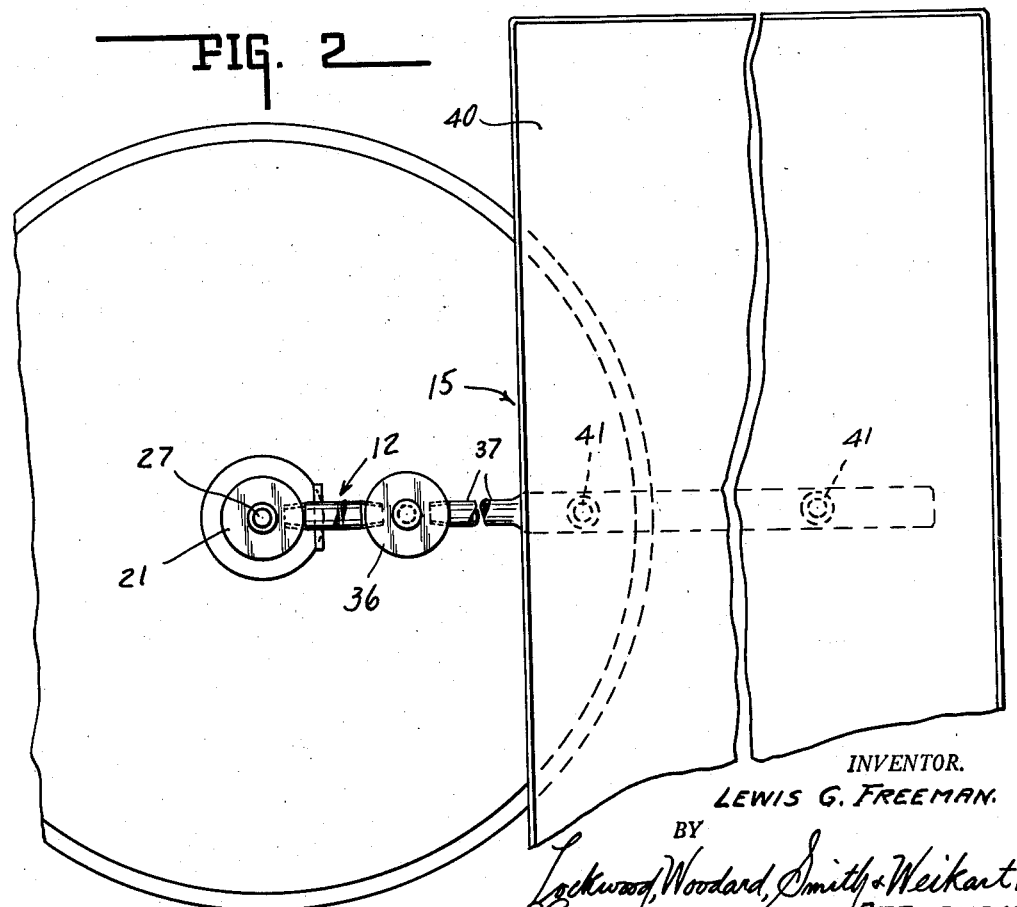
INVENTOR.
LEWIS G. FREEMAN.
BY
Lockwood, Woodard, Smith & Weikart.
ATTORNEYS.

United States Patent Office 2,991,138
Patented July 4, 1961

2,991,138
ADJUSTABLE SWINGABLE TRAY
Lewis G. Freeman, R.R. 3, Kokomo, Ind.
Filed Apr. 20, 1959, Ser. No. 807,374
1 Claim. (Cl. 311—37)

The present invention relates to an adjustable swingable tray and to a subcombination thereof, an adjustable swingable device for supporting an object.

The objects of the present invention are to provide an improved adjustable swingable tray; to provide a tray which may be positioned throughout a range of vertical positions and may be set throughout a range of angles and positions within a horizontal plane. Further objects of the present invention are to provide an improved adjustable swingable device for supporting an object and to provide a device which may be set throughout a range of angles or positions within a horizontal plane.

Still further objects of the present invention will become evident as the description proceeds.

The full nature of the invention will be understood from the accompanying drawings and the following description and claim:

FIG. 1 is a fragmentary side elevation of an adjustable swingable tray embodying the present invention.

FIG. 2 is a top view of the tray of FIG. 1.

FIG. 3 is a fragmentary view of certain portions of an alternative embodiment of my invention showing only those portions of the alternative embodiment which are different from the embodiment of FIGS. 1 and 2.

FIG. 4 is a top view of the structure illustrated in FIG. 3.

FIG. 5 is a detail front view of a washer forming a portion of the embodiment of FIGS. 3 and 4.

Referring now to the drawings, and more particularly to FIGS. 1 and 2, I have illustrated my invention as comprising an upright element 10, a mounting element 11 mounted upon the upright element 10 in such a manner as to be adjustable vertically, an arm indicated generally by the numeral 12 and mounted upon the mounting element 11 in such a manner as to be swingable horizontally and a tray indicated generally by the numeral 15 mounted upon the arm 12 in such a manner as to be swingable horizontally. The height of the tray 15 may be set at any desired value by adjusting the position of the mounting element 11 with respect to the upright element 10 and the position of the tray 15 may be set at any angle and position within the horizontal plane determined by the relative position of the mounting element 11 and the upright element 10 by pivoting the tray about the arm 12 and by pivoting the arm about the mounting element 11.

The upright element 10 of the embodiment of FIGS. 1 and 2 has a generally tubular shape and is fixed at its lower end within a circular shaped member 16 having sufficient weight to maintain the device upright no matter in what position the tray is located. It should be noted that the member 16 could be made from light metals (or could be smaller) and fixed to the floor by any suitable means. The mounting element 11 has a cylindrical shape, is received within the tubular upright element 10 and may be fixed in any desired upward or downward position by means of a knurled screw 18 received within the wall of the tubular upright element 10. A piece of internally threaded tubular stock 17 is fixed to the upright element 10 in such a manner as to provide additional bearing surface for the threaded portion of the screw 18.

The arm 12 is made up of a central tubular portion 20 having fixed to its ends cylindrical members 21 and 22. The cylindrical member 21 has a vertical cylindrical aperture 26 coaxially thereof which has received therein a vertical cylindrical stud 26 extending upwardly from the upward end of the mounting element 11. A screw 27 having an enlarged head for retaining the cylindrical member 21 upon the stud 26 is threadedly reecived within a suitable aperture in the stud 26. The vertical cylindrical aperture 25 in the cylindrical member 21 has such axial and radial dimensions that the arm 20 is freely swingable upon the stud 26, the enlarged head of the screw 27 being spaced from the upper surface of the cylindrical member 21 only such a distance as to provide such free swingability.

The cylindrical member 22 has a threaded vertical aperture therein which threadedly receives the threaded end 31 of a fastener 32 for pivotally mounting a second arm 35 upon the end of the arm 20. The second arm 35 is made up of a cylindrical member 36 and an elongated member 37 having the tray 40 itself fixed thereto by suitable fastening means 41—41, the numeral 15 being used to generically designate the tray member 40 and the second arm 35. The fastener 32 has, in addition to its threaded end 31, an enlarged central cylindrical portion 45 which is joined to the threaded end 31 by a radial portion 46 which abuts the upper surface of the cylindrical member 22, thus spacing the enlarged head 47 of the fastener only a sufficient distance from the upper surface of the cylindrical member 36 to allow free swingability of the tray 15 about the fastener 32.

Referring now to FIGS. 3 and 4, there is illustrated therein only the portions of an alternative embodiment which are different from the embodiment above described. The alternative embodiment comprises a vertical or upright element 50 which replaces the upright element 10 of the above described embodiment. The upright element 50 has a hollowed-out central portion 51 and a vertical slot 52 communicating between the outside of the upright element and the hollowed-out central portion. A washer 55 having a transverse dimension 55A greater than the transverse dimension of the slot 52 is received within the hollowed-out central portion of the upright member 50 and has seated therein a bolt 56, the threaded portion of which extends outwardly through the slot 52 and through a suitable aperture in the main body 57 of a mounting element indicated generally by the numeral 60.

A knob 61 of a suitable size for easy manual rotating has a threaded aperture within which the threaded portion of the bolt 56 is received. The mounting element 60 may be adjusted upwardly or downwardly by releasing the knob 61, by moving the mounting element 60 to the desired location and by retightening the knob 61 at the desired location. The main body 57 of the mounting element has a projection 62 of substantially rectangular shape which has a vertical threaded aperture therein for reception of the threaded end 66 of a fastener 67 which is identical in all respects to the fastener 32 above described. An arm indicated generally by the numeral 70 is swingably mounted upon the fastener 67 in exactly the manner above described as to the mounting of the arm 35 upon the fastener 32. The arm 70 is identical to the arm 12 above described. The main body 57 of the mounting element 60 has a pair of rectangular projections 71 extending into the vertical slot 52 of the upright element 50 for maintaining constant the attitude or angle of the mounting element 60. In all other respects the alternative embodiment of FIGS. 3 and 4 is identical to the embodiment of FIGS. 1 and 2.

It should be noted that the various parts of this invention could be made from any suitable material.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention and the scope of the claim are also desired to be protected.

The invention claimed is:

An adjustable swingable tray comprising an upright element having a hollowed-out interior and a vertical slot communicating between said hollowed-out interior and the outside of said upright element, a washer having a transverse dimensions larger than said slot and received within said hollowed-out interior, a bolt seated in said washer and having its screw-threaded portion extending through said slot outwardly of said upright element, a mounting element having an aperture through which said bolt passes, a knob having a screw-threaded aperture for reception on said bolt and for fixing said mounting element against said upright element whereby vertical adjustability of said mounting element is provided, a guide projecting from said mounting element into said slot for maintaining a constant attitude of said mounting element, said mounting element being formed with a vertical threaded aperture, an arm having at one end a vertical cylindrical aperture registering with said threaded aperture and having at the other end a vertical threaded aperture, a fastener formed with a threaded end threadedly received in the threaded aperture of said mounting element, formed with a central cylindrical portion of larger diameter than said threaded end, formed with a radial portion connecting said threaded end and said cylindrical portion and abutting the surface of said mounting element surrounding the threaded aperture of said mounting element, and formed with a head which retains said arm on said fastener, the vertical cylindrical aperture of said arm being of such radial and axial dimensions that said arm is freely swingable horizontally about said fastener, a second arm having at one end a vertical cylindrical aperture registering with said threaded aperture of said first mentioned arm, a second fastener formed with a threaded end threadedly received in the threaded aperture of said first mentioned arm, formed with a central cylindrical portion of larger diameter than said threaded end, formed with a radial portion connecting said threaded end and said cylindrical portion and abutting the surface of said first mentioned arm surrounding the threaded aperture of said first mentioned arm, and formed with a head which retains said second arm on said second fastener, the vertical cylindrical aperture of said second arm being of such radial and axial dimensions that said second arm is freely swingable horizontally about said second fastener, and a horizontal tray fixed to said second arm.

References Cited in the file of this patent

UNITED STATES PATENTS

| | | |
|---|---|---|
| 1,096,327 | Thorniley | May 12, 1914 |
| 1,114,948 | Walker | Oct. 27, 1914 |
| 1,218,923 | Bogdanski | Mar. 13, 1917 |
| 1,220,578 | Wise | Mar. 27, 1917 |
| 1,326,683 | Nelson et al. | Dec. 30, 1919 |
| 2,535,112 | Woody | Dec. 26, 1950 |